R. R. HANSON.
SHAFT COUPLING.
APPLICATION FILED MAY 21, 1913.
1,109,836.
Patented Sept. 8, 1914.
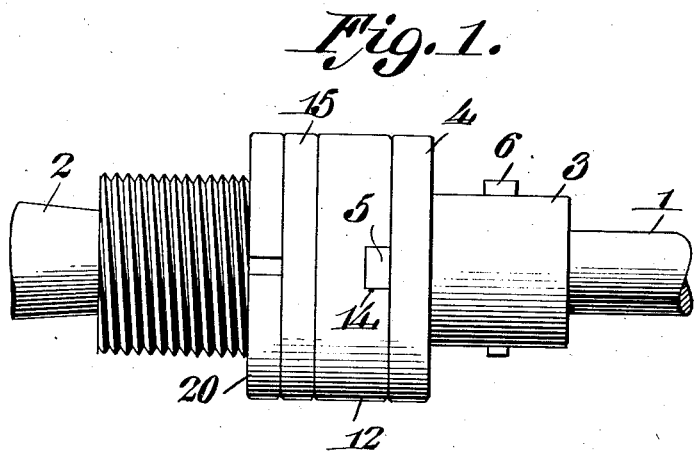
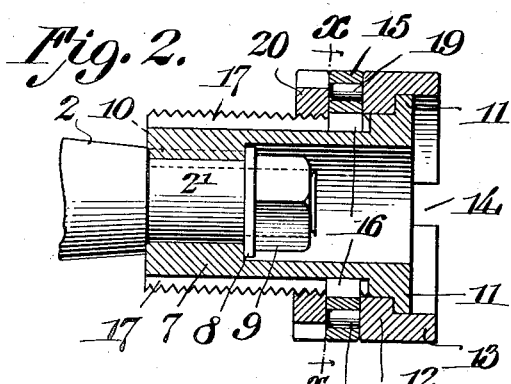
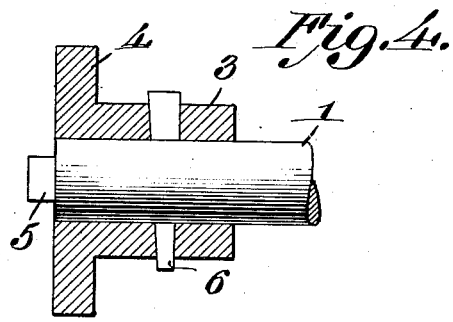
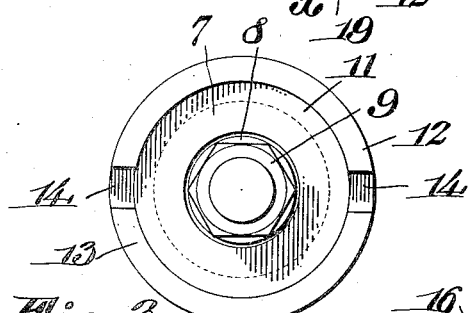
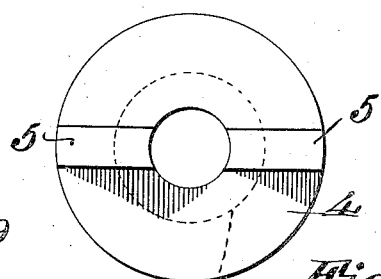
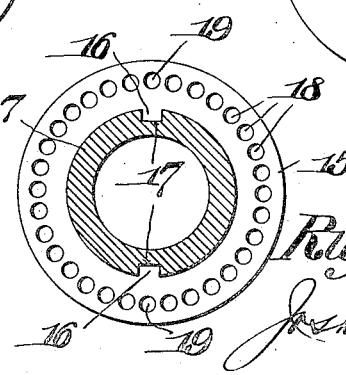
INVENTOR
Rufus R. Hanson,
BY
ATTORNEY
WITNESSES:

UNITED STATES PATENT OFFICE.

RUFUS R. HANSON, OF BOSTON, MASSACHUSETTS.

SHAFT-COUPLING.

1,109,836.   Specification of Letters Patent.   Patented Sept. 8, 1914.

Application filed May 21, 1913. Serial No. 768,934.

*To all whom it may concern:*

Be it known that I, RUFUS R. HANSON, a citizen of the United States, residing at Boston, county of Suffolk, and State of Massachusetts, have invented certain new and useful Improvements in Shaft-Couplings, of which the following is a specification.

My invention relates to shaft couplings and particularly to a coupling for connecting the engine and magneto shafts in motor vehicles.

The object of my invention is to provide a coupling for the engine and magneto shafts which may be readily adjusted to properly time the spark.

A further object of my invention is to provide a device of the class mentioned, which shall be of simple construction, which may be readily applied to the shafts and which will not readily get out of order.

Other objects will appear hereinafter.

With these objects in view my invention consists generally in a clutch member fixed to one of the shafts, a clutch member in swiveled connection with the other shaft and means fixed to the same shaft for holding the swiveled clutch member in adjusted position.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is an elevation of a clutch embodying my invention in its preferred form, Fig. 2 is a longitudinal section of the portion of the device attached to the magneto shaft, Fig. 3 is an end elevation of the same, Fig. 4 is a longitudinal section of the portion of the device on the engine shaft, Fig. 5 is an end view of the same and Fig. 6 is a sectional view taken on the line x—x of Fig. 2.

Referring now to the drawings 1 indicates the engine shaft and 2 the shaft of the magneto. Fixed to the shaft 1 is a clutch member comprising a sleeve 3 and disk 4 upon the face of the latter of which is formed a plurality of radially disposed ribs or bosses 5 to engage the clutch member on the magneto shaft. The clutch member is secured to the shaft 1 by a cotter pin 6.

Fixed to the magneto shaft 2 is a sleeve 7, the bore at one end of which fits snugly the reduced portion 2' of the shaft 2 and the remainder of the bore being of larger diameter to receive the washer 8 and nut 9. 10 indicates a key locking the sleeve against rotation on the shaft. The end of the sleeve 7 is formed with an outwardly projecting annular flange 11. Swiveled upon the sleeve 7 and retained in position by the flange 11 is a ring 12 having an annular flange 13 projecting beyond the flange 11 and provided with recesses 14 to receive the ribs or bosses 5 on the clutch member fixed to the engine shaft.

Slidably mounted upon the sleeve 7 is an annular member 15 formed with a pair of keys 16 arranged in longitudinally disposed key ways 17 formed in the said sleeve. The annular member 15 is provided with an annular series of apertures 18 to receive pins 19 projecting from the inner face of the ring 12. It is obvious that when the pins 19 are engaged in the apertures 18, the clutch ring 12 is rotatably fixed to the shaft.

20 indicates a jamb nut threaded upon the sleeve 7 to hold the annular member 15 in engagement with the ring 12.

To set the clutch in order to time the spark, the nut 20 is retracted and the annular member or ring 15 moved to disengage the pins 19 from the apertures 18. The ring 12 may then be turned until in proper position and the annular member 12 again moved into engagement therewith, there being a large number of apertures 18 and fine adjustment may be readily obtained. The nut 20 is then screwed firmly against the member 15 after which the device is ready for operation.

Having described my invention, I claim:

1. In a device of the class described, the adjacent shaft ends in combination with a clutch member fixed to one of said shafts, a clutch ring sleeve fixed to the other shaft, a clutch ring swiveled upon said sleeve, an annular member feathered upon said sleeve, coöperating means on said swiveled clutch member and said annular member for locking the former in adjusted position, and means for holding said annular member in operative position, substantially as described.

2. In a device of the class described, the adjacent shaft ends, a clutch member fixed to one of said shafts, a clutch member rotatably mounted upon the other shaft, a projection on the inner face of said last mentioned clutch member, a sliding member carried by said last mentioned shaft, and rotatable therewith, said member being provided with an annular series of apertures adapted to receive said projection and means for holding said member in operative position, substantially as described.

3. In a device of the class described, the adjacent shaft ends in combination with a clutch member fixed to one of said shafts, an externally threaded sleeve fixed to the other shaft, and provided on its outer face with a key way, a clutch member swiveled upon the end of said sleeve, an annular member slidably mounted on said sleeve and provided with a key arranged in said key way, said annular member being provided with an annular series of apertures, a pin on the adjacent face of said swiveled clutch member adapted to engage in any of said apertures and a jamb nut threaded upon said sleeve and adapted to hold said annular member in operative position, substantially as described.

In testimony whereof I have signed my name to this specification in the presence of two subscribing witnesses.

RUFUS R. HANSON.

Witnesses:
 WILLIAM V. FALLON,
 EDWARD A. RILEY.